(12) United States Patent
Menz

(10) Patent No.: US 11,831,719 B2
(45) Date of Patent: Nov. 28, 2023

(54) SIGNAL INTERFACE FOR APPLICATION IN VEHICLES

(71) Applicant: ZF Friedrichshafen AG, Friedrichshafen (DE)

(72) Inventor: Jochen Menz, Allgäu (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 93 days.

(21) Appl. No.: 17/693,764

(22) Filed: Mar. 14, 2022

(65) Prior Publication Data

US 2022/0311824 A1 Sep. 29, 2022

(30) Foreign Application Priority Data

Mar. 26, 2021 (DE) .................... 10 2021 202 980.9

(51) Int. Cl.
*H04L 67/02* (2022.01)
*B60R 16/023* (2006.01)
*B60R 16/02* (2006.01)
*H02H 7/20* (2006.01)
(Continued)

(52) U.S. Cl.
CPC .......... *H04L 67/12* (2013.01); *B60R 16/0207* (2013.01); *B60R 16/0231* (2013.01); *G08C 19/16* (2013.01); *H02H 7/20* (2013.01)

(58) Field of Classification Search
CPC .......... H04L 67/12; H04L 12/40; H04B 1/16; H04B 1/04; H04B 1/40; B60R 16/03; B60R 16/0207; B60R 16/023; B60R 16/0231; G08C 19/16; H02H 7/20; H02H 9/04; G05B 19/0423; G05B 2219/25257
See application file for complete search history.

(56) References Cited

U.S. PATENT DOCUMENTS 9,647,716 B2 5/2017 Hammerschmidt
9,970,374 B2 * 5/2018 Collet .................... F02D 41/28
(Continued)

FOREIGN PATENT DOCUMENTS

DE 10 2014 113 456 A1 3/2016
DE 10 2016 218 530 A1 3/2018

OTHER PUBLICATIONS

German Patent Office, Search Report for German Patent Application No. 10 2021 202 980.9 (dated Nov. 9, 2021).

*Primary Examiner* — David S Huang
(74) *Attorney, Agent, or Firm* — Finch & Maloney PLLC

(57) ABSTRACT

A signal interface for a vehicle has a sensor unit and a main control unit connected via a wiring harness. The sensor unit includes a sensor chip configured to carry out a SENT protocol and has outlets for a supply voltage line, a data transmission line, and a ground connection. A voltage regulator and a filter with ESD/EMC protection are connected to the supply voltage line, where overvoltage protection is upstream of a data line filter and ESD/EMC protection is downstream of the data line filter. The main control unit includes a voltage regulator, ESD/EMC protection, and a module configured to switch off the ground supply in the event of a current derived from the overvoltage protection. A pull-up device and a transceiver are connected to the data transmission line. The control unit has separate sender and receiver paths for controlling the transceiver.

15 Claims, 1 Drawing Sheet

(51) Int. Cl.
  *G08C 19/16*     (2006.01)
  *H04L 67/12*     (2022.01)

(56) References Cited

U.S. PATENT DOCUMENTS

| | | | |
|---|---|---|---|
| 2007/0173083 A1* | 7/2007 | Kopplin | H04L 12/403 |
| | | | 439/76.1 |
| 2011/0211289 A1 | 9/2011 | Kosowsky et al. | |
| 2019/0219421 A1 | 7/2019 | Hoffmann et al. | |
| 2022/0107345 A1* | 4/2022 | Nakagawa | G01R 19/16576 |

* cited by examiner

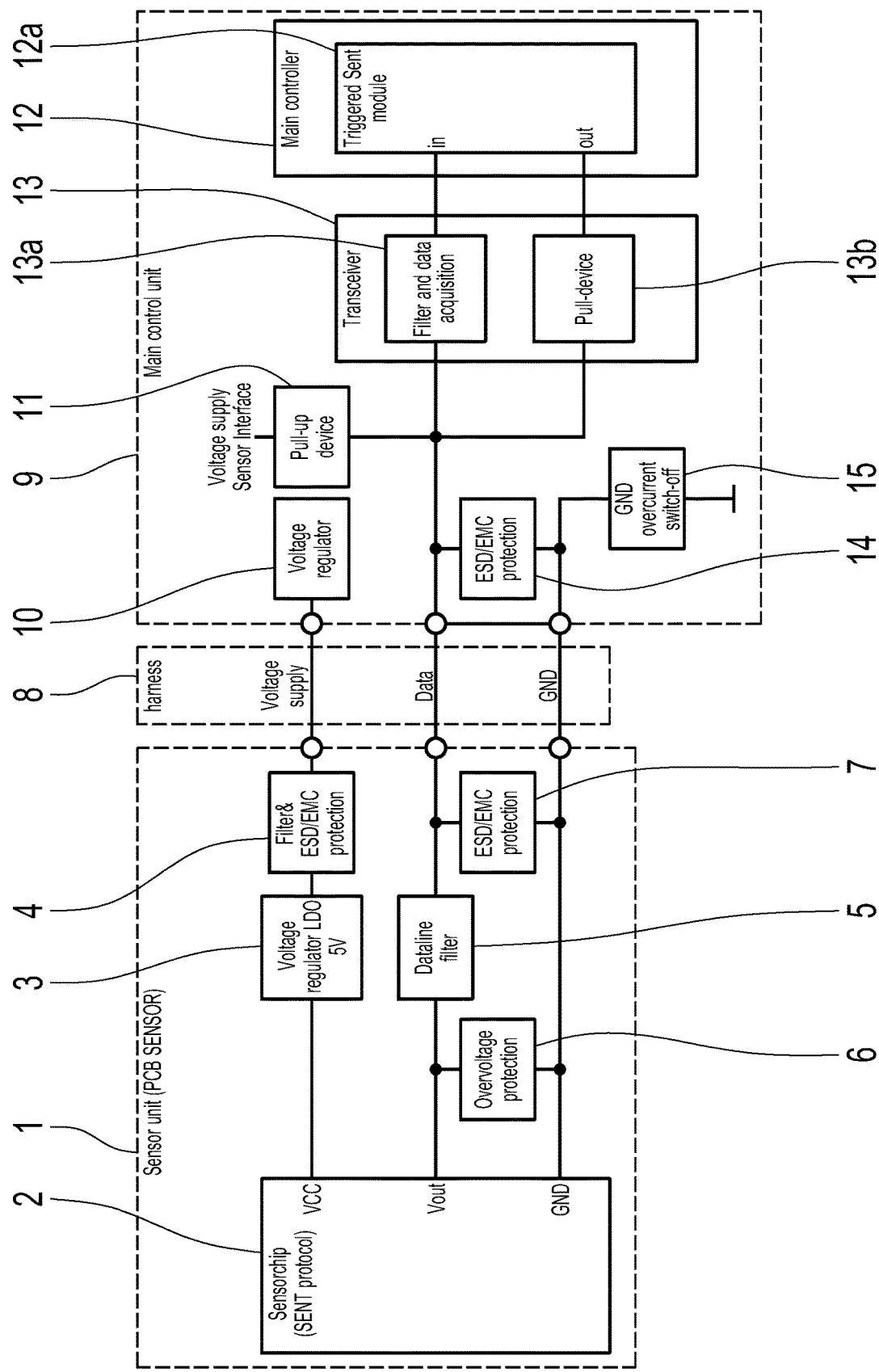

SIGNAL INTERFACE FOR APPLICATION IN VEHICLES

RELATED APPLICATIONS

This application claims the benefit of and right of priority under 35 U.S.C. § 119 to German Patent Application no. 102021202980.9, filed Mar. 26, 2021, the contents of which are incorporated herein by reference in its entirety.

BACKGROUND

The present invention relates to a signal interface for use in vehicles with an on-board power supply voltage of at least 24V.

SUMMARY

The SENT (Single Edge Nibble Transmission) interface according to SAE J2716 is widely used in the automotive sector for transmitting data from a sensor unit to a main control unit. The problem is that the sensors available on the market are not suitable for the requirements of operational systems with 24V or more, i.e. for example there is no protection against short-circuits. Furthermore, for the target application a data refresh rate must be chosen, which is above the data refresh rate specified in the SENT standard.

Accordingly, a purpose of the present invention is to provide a signal interface for use in on-board power supplies with 24V or more, by virtue of which a robust interface is made available with which the data refresh rate required for such applications is also achieved. According to the invention, that objective is achieved by the characteristics specified in the independent claims. Advantageous design features are the object of the dependent claims.

A signal interface is proposed, for use in vehicles that comprise a sensor unit and a central control unit which are in signal-exchanging connection by way of a wiring harness. The sensor unit comprises: a sensor chip designed to carry out a SENT protocol, with an outlet for a supply voltage line, an outlet for a data transmission line, and an outlet for a ground connection. In addition, a voltage regulator and a filter with ESD/EMC protection are provided, which are connected to the supply voltage line. There are also a data line filter connected to the data transmission line, an overvoltage protection arranged upstream from the data line filter, and an ESD/EMC protection arranged downstream from the data line filter, which are connected both to the data transmission line and also to ground.

The main control unit comprises a voltage regulator connected to the supply voltage line, an ESD/EMC protection connected both to the data transmission line and also to ground, and a module connected to the ground of the sensor unit and the main control unit, which is designed, in the event of a current derived via the overvoltage protector, to switch off the ground supply. In that way the sensor unit or more precisely the data transmission line is protected against short-circuits to the on-board supply voltage. In addition, a pull-up component connected to the data transmission line and a transceiver connected to the data transmission line, the said transceiver comprising a receiver section and a sender section are provided, as well as a control unit connected to the transceiver. The control unit has a separate sender path which is connected to the sender section of the transceiver, and a separate receiver path connected to the receiver section of the transceiver, in order to control the transceiver.

By virtue of the proposed arrangement of components a robust interface and a high data refresher rate can be achieved.

In an embodiment, the receiver section of the transceiver is designed to carry out the signal conditioning of the data signal, which is sent by the sensor chip by way of the data transmission line, and to make the control unit available for evaluation.

In an embodiment, the sender section of the transceiver is in the form of a pull-device and is designed to pull the data transmission line (Vout) to a low level.

In an embodiment, the voltage regulator of the main control unit produces an intermediate voltage derived from the on-board supply voltage. Advantageously, in that way the voltage regulator of the sensor unit can be made as a linear voltage regulator.

In an embodiment, the sensor chip is a position sensor. In an embodiment, the sensor chip is provided in an electric motor of a vehicle.

Furthermore, a use of a signal interface in an electric motor of a vehicle is proposed.

In addition, a vehicle is proposed which comprises the proposed signal interface. Advantageously, the vehicle has an on-board power supply voltage of at least 24V.

Further features and advantages of the invention emerge from the following description of example embodiments of the invention, with reference to the FIGURE in the drawing, which shows details according to the invention, and from the claims. The individual features can each be realized individually as such, or several at a time in any combination in a variant of the invention.

Preferred embodiments of the invention are explained in greater detail below, with reference to the attached drawing.

BRIEF DESCRIPTION OF THE DRAWING

FIG. 1 shows a circuit structure of a signal interface according to an embodiment of the present invention.

DETAILED DESCRIPTION

SENT interfaces according to SAE J2716 are widely used in vehicle applications to transmit data from a sensor unit to a central or main control unit. However, the currently available sensors are not suitable for applications in on-board power supplies with 24V or more, particularly in relation to their robustness against short-circuits and interfering impulses. Moreover, the data refresh rate required is higher than the data refresh rate demanded in the SENT standard.

To overcome these problems, the interface between such an external sensor unit 1 and the main control unit 9 is modified so that a data refresh rate higher than that required on the basis of the SENT protocol is ensured and so that it meets the demands of interfaces by way of a wiring harness 8, i.e. it is robust in relation to short-circuits to the supply voltage and ground, and also robust in relation to interfering impulses and electromagnetic interferences.

For the robustness of the interface and to achieve the high data refresh rate, special switching circuits are provided in the sensor unit 1, whose functions are described below with reference to FIG. 1.

The sensor unit 1 comprises a number of component parts which are in signal-exchanging communication with components of the main control unit 9 by way of a wiring harness 8.

In the sensor unit 1 a sensor chip 2 is provided for determining the desired information and for preparing the data of the information at the required speed. This comprises an outlet for a supply voltage line VCC, an outlet for a data transmission line Vout and an outlet for ground GND. Such a sensor is in particular integrated in an electric motor and can be one of the position sensors of the electric motor. However other sensors too, such as yaw-rate sensors, angle sensors etc., can also be protected by the proposed circuit arrangement when they are needed to have correspondingly rapid data refresh rates and robustness against short-circuits and interfering impulses.

Furthermore, to the supply voltage line VCC is connected a low-drop voltage regulator 3 to produce the supply voltage VCC required by the sensor chip, as a rule 5V, and to ensure sufficient robustness against the maximum voltage occurring in the system, which can differ depending on the on-board supply voltage. This circuit block contains all the necessary components for the stability and buffering of the supply voltage. Directly after that (in series), a filter with ESD/EMC protection 4 is arranged on the supply voltage line VCC in order to ensure sufficient ESD (electrostatic discharge) strength and to suppress electromagnetic interferences EMC produced by the sensor chip 2, so that these cannot be radiated via the wiring harness 8. By way of the wiring harness 8 the filter with ESD/EMC protection 4 is connected to a voltage regulator 10 of the main control unit 9. This serves to produce an intermediate voltage derived from the on-board supply voltage in order, in the sensor unit 1, to be able to use a linear voltage as the low-drop voltage regulator LDO and keep its power loss within manageable limits.

Furthermore, in the sensor unit 1 a data line filter 5 connected to the data transmission line Vout is provided. The filter required is contained in this block in order to ensure robustness against interfering impulses.

In addition, an overvoltage protection 6 connected both to the data transmission line Vout and to ground is provided between the sensor chip 1 and the data line filter 5. The overvoltage protection 6 contains an overvoltage protection element so that the voltage is restricted to values within a specified, valid voltage range. After that, i.e. between the data line filter 5 and the wiring harness 8, a further ESD/EMC protection 7 is provided. This ESD/EMC protection 7 also serves to ensure sufficient ESD/EMC robustness, as already described for the ESD/EMC protection 4.

The lines emerging from the sensor unit 1, i.e. the supply voltage line VCC, the data transmission line Vout and the ground GND, are also in signal-exchanging connection with components of the main control unit 9, as described below.

As already mentioned, the voltage regulator 10 of the main control unit 9 is connected to the filter with ESD/EMC protection 4 of the sensor unit 1.

On the side of the main control unit 9 there is in turn a further ESD/EMC protection 14 between the data transmission line Vout and ground GND, in order to ensure sufficient ESD robustness and to suppress/filter electromagnetic interferences. After that a module 15 (GND overcurrent switch-off) is provided, which is connected to ground and to the sensor chip 2 and also to the main control unit 9. The module 15 is designed to switch off the ground supply in the event of a current derived from the overvoltage protection 6 of the sensor unit 1. In this module it is analyzed to what extent the current derived from the sensor unit 1 is within a usual range. If there is any additional current, for example due to a short-circuit, then according to the supply voltage, which is derived via the overvoltage protection 6, the module 15 switches the ground supply off so that no further current flow takes place and the sensor unit 1, in particular the sensor chip 2, cannot be destroyed. The module 15 can be made by an analog circuit of a resistance and a switch element. The important thing is that above a specified voltage the ground connection GND of the sensor chip 2 is switched off.

Farther along the data transmission line Vout of the sensor unit 1 via the wiring harness 8 and downstream from the ESD/EMC protection 14, a junction is provided, on which a pull-up device 11 is provided which is connected to the voltage supply of the sensor interface. This pull-up device 11 is the resistance required by the SENT standard against the reference voltage for transmission. According to the invention, this must be different compared with the values specified in the SENT standard, i.e. lower, in order to be able to achieve the high data refresh rates.

At another junction a receiver path 13a (filter and data acquisition) of a transceiver 13 is provided. In this receiver path 13a the signal conditioning of the data signal sent by the sensor chip 2 is carried out and the main controller unit 12 arranged downstream is made available for evaluation. Here too an interference filter is provided in order to remove unwanted interference signals.

At another junction, a sender section 13b (pull device) of the transceiver 13 is provided. By way of the sender section 13b the data transmission line Vout is pulled to a low level (triggering) so that the sensor chip starts with data generation and data transmission. For that reason, the sender section 13b is also called the pull device.

The control unit 12 arranged downstream from the transceiver 13 provides the necessary triggered SENT protocol module 12a. Its main characteristic is that the control of the external transceiver 13 is supported by a separate "out" sender path (connected to the sender section 13b) and a receiver path "in" (connected to the receiver path 13a).

An advantageous feature of the circuit arrangement of this signal interface is that if 24V or more are applied, the sensor unit 1 is protected against simple defects such as short-circuits relative to the supply voltage and ground, which can happen in motor vehicles.

Rapid data transmission rates require low-impedance circuit components in the sender and receiver paths which, however, have a counterproductive effect for the necessary robustness against short-circuits and electromagnetic interference phenomena. The proposed signal interface with the components of the interface between the sensor unit 1 and the main control unit 9 can fulfill the strict demands for data transmission rates.

The protection of the data transmission line Vout against short-circuits to the on-board power supply voltage takes place by virtue of a prompt switching-off of the negative reference potential (ground GND) by the module 15.

The signal interface is used in the automotive sector, particularly in vehicles with an on-board power supply voltage of 24V or more, such as in trucks. The design of the individual components depends in particular on the sensor chip 2 used and on the control unit 12 used.

INDEXES

1 Sensor unit
2 Sensor chip
3 Voltage regulator
4 ESD/EMC protection
5 Data line filter
6 Overvoltage protection
7 ESD/EMC protection 8 Wiring harness
9 Main control unit
10 Voltage regulator
11 Pull-up device
12 Control unit
12a Triggered SENT module
13 Transceiver
13a Filter and data acquisition
13b Pull device
14 ESD/EMC protection
15 GND overcurrent switch-off module

The invention claimed is:

1. A signal interface for use in a vehicle, the signal interface comprising a sensor unit and a main control unit which are in signal-exchanging connection by way of a wiring harness, wherein
the sensor unit comprises:
a sensor chip configured to carry out a SENT protocol, the sensor chip comprising an outlet for a supply voltage line, an outlet for a data transmission line, and an outlet for a ground connection;
a voltage regulator and a filter with ESD/EMC protection connected to the supply voltage line;
a data line filter connected to the data transmission line; and
an overvoltage protection arranged upstream from the data line filter and an ESD/EMC protection arranged downstream from the data line filter, which are connected both to the data transmission line and also to ground; and
the main control unit comprises:
a voltage regulator connected to the supply voltage line;
an ESD/EMC protection connected both to the data transmission line and to ground;
a module connected to the ground of the sensor unit and to the main control unit, which wherein the module is configured, in the event of a current derived via the overvoltage protection, to switch off the ground supply;
a pull-up device connected to the data transmission line;
a transceiver connected to the data transmission line, the transceiver comprising a receiver section and a sender sectio); and
a control unit connected to the transceiver, the control unit having a separate sender path (out) connected to the sender section of the transceiver and a separate receiver path (in) connected to the receiver section of the transceiver, the control unit configured for the control of the transceiver.

2. The signal interface according to claim 1, wherein the receiver section of the transceiver is configured to carry out the signal conditioning of the data signal sent by the sensor chip by way of the data transmission line and to make available the control unit for evaluation.

3. The signal interface according to claim 1, wherein the sender section of the transceiver is in the form of a pull device and is configured to pull the data transmission line to a low level trigger so that the sensor chip begins data transmission.

4. The signal interface according to claim 1, wherein the voltage regulator of the main control unit produces an intermediate voltage derived from the on-board power supply voltage.

5. The signal interface according to claim 4, wherein the voltage regulator of the sensor unit is a linear voltage regulator.

6. The signal interface according to claim 1, wherein the sensor chip is configured as a position sensor.

7. An electric motor of a vehicle comprising the signal interface according to claim 1, wherein the sensor chip is provided in the electric motor.

8. The signal interface according to claim 1, wherein the signal interface is configured for use with an electric motor of a vehicle.

9. A vehicle comprising the signal interface according to claim 1.

10. The vehicle according to claim 9, comprising an on-board power supply voltage of at least 24V.

11. The vehicle according to claim 9, wherein the receiver section of the transceiver is configured to carry out the signal conditioning of the data signal sent by the sensor chip by way of the data transmission line and to make available the control unit for evaluation.

12. The vehicle according to claim 9, wherein the sender section of the transceiver is in the form of a pull device and is configured to pull the data transmission line to a low level trigger so that the sensor chip begins data transmission.

13. The vehicle according to claim 9, wherein the voltage regulator of the main control unit produces an intermediate voltage derived from the on-board power supply voltage.

14. The vehicle according to claim 13, wherein the voltage regulator of the sensor unit is a linear voltage regulator.

15. The vehicle according to claim 9, wherein the sensor chip is configured as a position sensor.

* * * * *